July 10, 1923.
Re. 15,647
C. R. WOOD
RULE POCKET
Original Filed Sept. 25, 1920
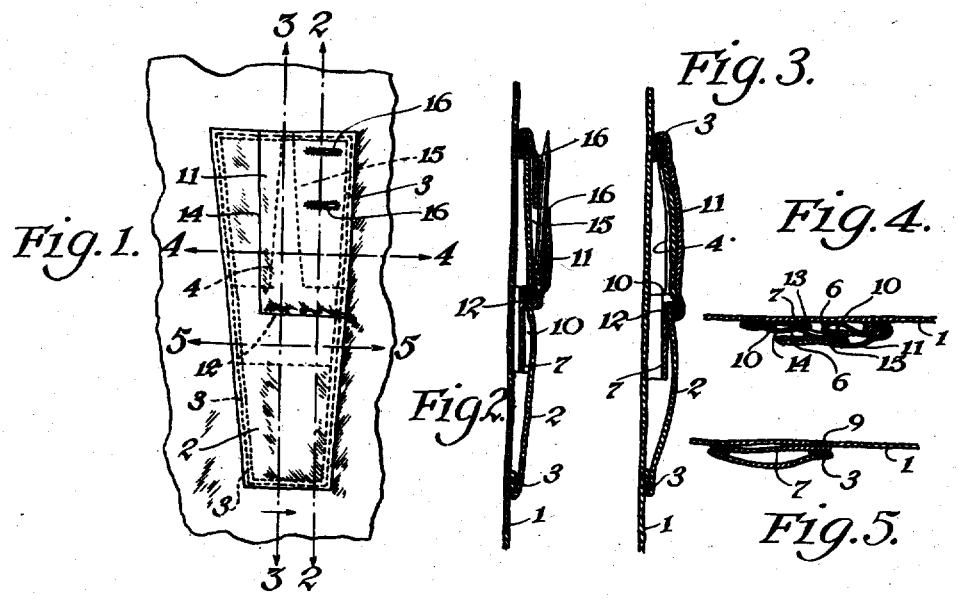
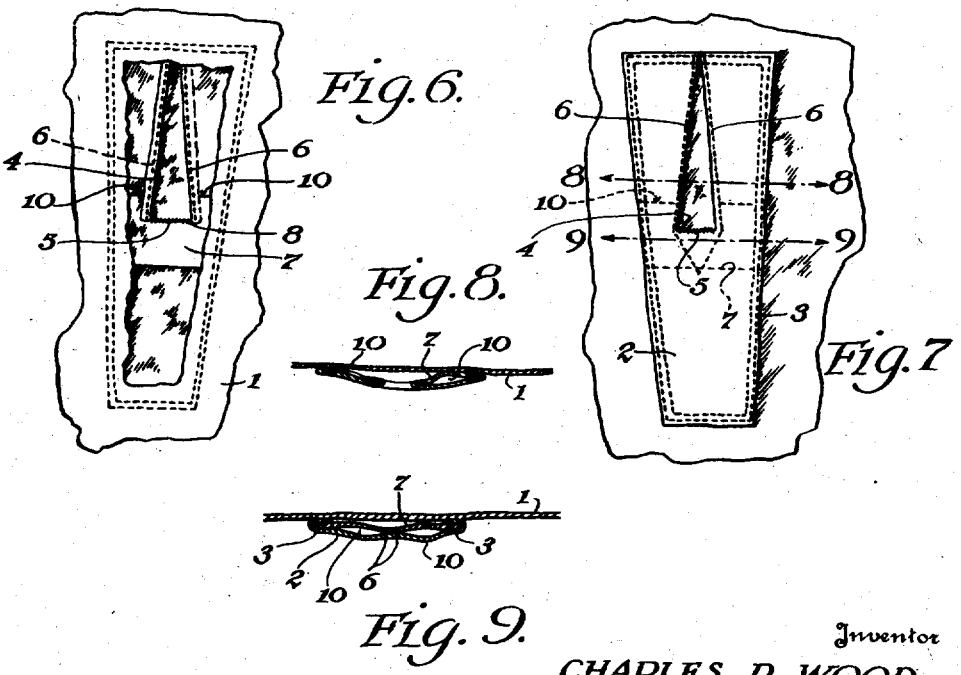
Inventor
CHARLES R. WOOD.
By Watson E. Coleman.

Reissued July 10, 1923. Re. 15,647

UNITED STATES PATENT OFFICE.

CHARLES R. WOOD, OF FARGO, NORTH DAKOTA.

RULE POCKET.

Original No. 1,407,837, dated February 28, 1922, Serial No. 412,764, filed September 25, 1920. Application for reissue filed February 28, 1923. Serial No. 621,964.

*To all whom it may concern:*

Be it known that I, CHARLES R. WOOD, a citizen of the United States, residing at Fargo, in the county of Cass and State of North Dakota, have invented certain new and useful Improvements in Rule Pockets, of which the following is a specification, reference being had to the accompanying drawings.

This invention relates to rule pockets, and more particularly to a pocket for the reception of devices such as rules, which is so constructed that the rule may not easily fall therefrom.

A further object of the invention is the provision of a pocket for the reception of a rule having intermediate its side edges and adjacent the top thereof a substantially vertically extending opening through which the rule may be inserted and withdrawn from the pocket, and which opening being disposed intermediate the side edges of the pocket and being vertically disposed permits the upper end of the rule or other contained object therein to fall to one side or the other of the opening and, therefore, not project from the opening of the pocket when the pocket is flexed, as in the bending of the leg of the wearer of a garment to which the pocket is applied.

A further object of the invention is to provide in a pocket of this construction a flap for covering and reinforcing the pocket opening.

A still further object of the invention is to provide a protecting flap of this character which by its construction admits of its use as an exterior pocket for the reception of small articles, such as pencils.

A further object of the invention is to provide means for reinforcing the lower end of the pocket opening disposed interiorly of the pocket proper, and which reinforcement may, if so desired, be constructed in such a manner as to form a holding device for pencils or similar articles interiorly of the pocket.

The invention comprises further features and combination of parts as will hereinafter be more fully set forth, shown in the drawings, and claimed.

In the drawings:—

Figure 1 is a view of a fragmentary portion of a mechanic's garment, showing the application of the improved rule pocket and the same constructed in accordance with the invention;

Figure 2 is a vertical sectional view on line 2—2 of Figure 1;

Figure 3 is a vertical sectional view on line 3—3 of Figure 1;

Figure 4 is a horizontal sectional view on line 4—4 of Figure 1;

Figure 5 is a horizontal sectional view on line 5—5 of Figure 1;

Figure 6 is a view in elevation of the inner face of a portion of the garment, showing the pocket applied, and illustrating a portion of the material of the garment cut away, thereby illustrating the interior of the pocket and the manner of folding the edges of the opening to the pocket;

Figure 7 is a view in elevation of a portion of a mechanic's garment, showing a modified form of rule pocket constructed in accordance with the invention and applied thereto;

Figure 8 is a sectional view on line 8—8 of Figure 7; and

Figure 9 is a transverse sectional view on line 9—9 of Figure 7.

Referring to the drawings, 1 designates a portion of a garment, which may be constructed of any suitable material, and 2 denotes a piece of similar fabric which is stitched at 3 to the garment 1 about its side edges. This piece of fabric 2, which may be of desired length and width, is preferably made wider at the top than at the bottom for a purpose presently to appear. The exterior wall or fabric piece 2 of the pocket has an opening 4 to permit access to the interior of the pocket and which is substantially vertically disposed and spaced from the adjacent side edges of the piece 2. In order to form this opening the piece 2 is horizontally slitted at a point intermediate its upper and lower ends, the slit terminating short of the side edges of the piece 2, and one edge of the slit is preferably whipped with a buttonhole stitch, as at 5. The fabric piece 2 is then slitted vertically upwardly from the transverse slit at the approximate center of the slit, after which the edge portions of the vertical slit are folded back and stitched, as shown at 6. It will be noted that the opening 4 thus formed is substantially V-shaped in the preferred formation thereof, the base of the opening being wider for permitting the ready insertion to or removal from the pocket of a rule or similar article. The exterior wall or fabric piece 2 of the pocket before it is stitched to the garment has its marginal edges underturned so as to present a neat appearance from the exterior.

Attention is directed to the fact that the opening arranged at the upper end of the pocket is vertically disposed and arranged intermediate the sides of the pocket. Accordingly a rule placed in the pocket upon an inclination of the pocket will tend to move to one side edge or the other of the pocket and when against such side edge is not in alignment with the pocket opening and accordingly will not protrude therefrom when the pocket is flexed. The particular value of this arrangement will become apparent when it is pointed out that rule pockets of overalls are ordinarily applied to the overalls upon the side of the leg and that accordingly when stooping, a posture often assumed by mechanics, the rule pocket will be substantially horizontally arranged. The pocket will at the same time by the flexing of the material of the garment be flexed and with the ordinary construction of the rule pocket the result is the forcing of the rule through the opening of the pocket so that it falls to the ground. The upper end of the pocket proper being closed and the rule falling to one side of the opening 4, any flexing of the material will merely tend to force the end of the rule into engagement with the upper end of the pocket and not through the opening 4 in this construction, thereby eliminating a highly objectionable feature of rule pockets as now formed.

Arranged transversely of the pocket immediately adjacent the lower edge of the opening and interiorly of the piece 2 is a piece of fabric 7. This transverse piece of fabric is cut away to conform to the lower end of the opening 4, is indicated at 8, and the lower edge of this cut-away portion is stitched to the lower edge of the pocket opening preferably by the stitches 5 before referred to. The vertical edges of the cut-away portion 8 are engaged under the folded edge portions of the vertical slit, the stitching 6 of these edge portions acting to hold the transverse piece of fabric 7 in position. The end edges of the transverse strip 7 are engaged between the underturned portions 9 of the side edges of the piece 2 and the body of said piece and are secured thereto by the stitches 3 extending through the piece 2 to secure the same to the body fabric 1. It will be seen that being secured to the lower edge of the opening and to the side edges of the piece 2 and the body fabric, the transverse piece of fabric 7 forms a reinforcement for the lower end of the opening, supporting the same against the downward drag so often applied to the lower edges of vertical openings of pockets and preventing splitting of the material at the lower edges of this opening. Additionally the transverse piece of fabric causes to be formed a pair of pencil receiving pockets 10 at opposite sides of the opening 4, since this piece of fabric is secured to the body 2 at the opening 4 and at its end edges but is unsecured thereto intermediate such points so that pencils or similar articles may be inserted through the opening 4 and introduced between the fabric and the exterior wall of the pocket.

In the preferred construction of the pocket and as shown in Figures 1 to 6 inclusive, a cover or flap 11 is provided for the opening 2 to the pocket. To provide this cover, the flap constituting the cover is stitched at 12 along its lower edge with the fabric piece 2 at a point immediately below the low end of the opening 4 and the cover is then folded upon itself, as shown in Figure 2, to obscure the stitches 12. Assuming the pocket to be applied to the garment at the side thereof and more particularly to the outer side of the leg of the garment, the cover 11 extends from the upper forward edge of the exterior wall 2 of the pocket in a direction toward the rear edge of the exterior wall to a point a little beyond the rear edge of the opening 4, the forward edge of the cover being included in the stitching 3 which secures the wall 2 of the pocket to the garment. The rear edge of the cover 11 has a portion 13 thereof folded upon itself, as indicated at 14, and the forward margin of the portion 13 and the forward marginal edge of the opening 4 are stitched together, as indicated at 15. The upper marginal edge of the cover 11 substantially coincides with the upper marginal edge of the fabric piece 2 and is stitched thereto by the stitching 3 hereinbefore mentioned.

Attention is directed to the fact that by this construction the cover or flap 11 not only provides a covering for the opening 4 but serves to connect and reinforce the fastening of the separated portions of the upper edge of the fabric piece 2, preventing any drag upon the fabric piece 2 such as it is subjected to in placing articles in or withdrawing articles from the pocket from separating the upper edge of the fabric piece 2 at its conjunction with the body piece 1 and at the edges of the opening 4 being stitched at its lower edge to the fabric piece. Immediately below the lower end of the opening and at its upper edge to the body portion 1 and to the piece 2, any strain applied at the bottom of the opening 4 will be transmitted thereby to the body fabric 1, preventing undue strain being placed upon the bottom of the opening and thereby assisting the strip 7 hereinbefore referred to in reinforcing the opening.

It will be noted that between the fabric piece 2 and the flap or cover 11 a compartment is formed, which compartment, if so desired, may be provided with an opening or openings 16 affording access thereto so that this compartment may be employed as a pocket for the reception of small articles, such as pencils or the like. It will be noted that the folding of the free edge of the cover flap 11 provides a double thickness of reinforcing material from which the flap proper or that portion immediately overlying the opening is formed, thereby giving added strength to the structure of the pocket. In using the cover, as shown in Figures 1 to 4, the forward marginal edge of the opening 4 is preferably folded upon the outer surface of the fabric piece 2 and between this fabric piece 2 and the portion 13 to which it is attached. In applying the cover 11 to the fabric piece 2, the forward edge portions of the cover are preferably folded under the fabric piece at the edge thereof before the application of the stitches 3, this feature of the construction being clearly shown in Figure 4.

In Figures 7, 8 and 9, the cover for the pocket is eliminated. Otherwise the construction of the pocket is the same as that previously described and illustrated in Figures 1 to 6. While this construction may be employed if so desired, the construction illustrated in Figures 1 to 6 is preferred, in that the flap or cover 11 additionally reinforces the pocket, provides a cover for the opening 2, and may, as hereinbefore set forth, be employed to provide additional pocket space.

I claim:—

1. In a rule pocket, a portion of a garment, a piece of fabric secured thereto to form a pocket, the piece of fabric having formed therein intermediate its side edges a substantially vertically extending elongated opening, and a cover piece secured along the top, bottom and one vertical edge thereof to said piece of fabric, the free edge of said cover piece extending over and forming a flap for said opening, and a portion bent back from said free edge and secured to the fabric piece adjacent the vertical edge of said opening next adjacent the secured vertical edge of such cover.

2. In a rule pocket, a portion of a garment, a piece of fabric secured thereto to form a pocket, the piece of fabric having formed therein intermediate its side edges a substantially vertically extending elongated opening, and a cover piece secured along the top, bottom and one vertical edge thereof to said piece of fabric, the free edge of said cover piece extending over and forming a flap for said opening, the fabric piece being attached to said cover along the vertical edge of said opening next adjacent the attached vertical edge of such cover.

3. In a rule pocket, a portion of a garment, a piece of fabric secured thereto to form a pocket, the piece of fabric having formed therein intermediate its side edges a vertically elongated opening extending from a point adjacent the top of the fabric piece to a point midway the ends thereof, and a cover piece secured to the fabric piece adjacent the lower edge of the opening and at its upper edge to the upper edge of the fabric and to the portion of the garment reinforcing the fabric piece at the lower end of the opening and forming a flap for the opening.

4. In a rule pocket, a portion of a garment, a piece of fabric secured thereto to form a pocket, the piece of fabric having formed therein intermediate its side edges a vertically elongated opening extending from a point adjacent the top of the fabric piece to a point midway the ends thereof, and a cover piece secured to the fabric piece adjacent the lower edge of the opening and at its upper edge to the upper edge of the fabric and to the portion of the garment reinforcing the fabric piece at the lower end of the opening and forming a flap for the opening, said cover piece being secured to a vertical edge of the opening.

5. In a rule pocket, a portion of a garment, a piece of fabric secured thereto to form a pocket, the piece of fabric having formed therein intermediate its side edges a substantially vertically extending elongated opening, and a cover piece secured along the top, bottom and one vertical edge thereof to said piece of fabric, the free edge of said cover piece extending over and forming a flap for said opening, and a portion bent back from said free edge and secured to the fabric piece adjacent the vertical edge of said opening next adjacent the secured vertical edge of such cover, said cover piece and piece of fabric combining to form therebetween a compartment, said compartment having an opening affording access thereto and permitting use of the compartment as a pocket.

6. In a pocket for mechanics' garments, a portion of a garment, a fabric piece fastened to the portion of a garment, the portion of the garment and the piece forming the interior and exterior walls of a pocket, said exterior wall having a vertically elongated opening to permit access to the interior of the pocket, and a transverse piece of fabric having its side edges fastened between the vertical edge portions of the outer wall of the pocket and the garment and secured centrally to the fabric piece at the lower end of the opening.

7. In a pocket for mechanics' garments, a portion of a garment, a fabric piece fastened to the portion of a garment, the fabric of the garment and the piece forming the interior and exterior walls of a pocket to receive a rule, said exterior wall having an elongated opening to permit access to the interior of the pocket, and a transverse piece of fabric fastened between the vertical edge portions of the outer wall of the pocket and the garment, said transverse piece being separable at points between the forward and rear edges of the opening and the fastening means between the exterior wall and the garment wall, thereby providing interior pencil holding means.

8. In a rule pocket, a portion of a garment, an integral piece of fabric fastened to the portion of a garment and having its upper portion provided with a vertically extending, elongated opening spaced from the side edges thereof, said piece of fabric and the garment constituting the exterior and interior walls of the rule pocket, the base of said opening being relatively broad, the opening decreasing in width upwardly.

9. In a rule pocket, a portion of a garment, a piece of fabric fastened to the portion of a garment and having its upper portion provided with a vertically extending, elongated opening disposed intermediate the side edges of the piece, the lower edge of said opening being reinforced, and a cover secured to the upper exterior face of the fabric piece having a free edge overlying said opening, said cover being attached to the opening along one vertical edge thereof.

10. In a rule pocket, a portion of a garment, a piece of fabric fastened to the portion of a garment and having its upper portion provided with an elongated opening, said piece of fabric and the garment constituting the exterior and interior walls of the rule pocket, said opening to the pocket being V-shaped and having its forward and rear elongated edges folded and its lower transverse edge provided with a buttonhole stitch, and a cover secured to the upper exterior face of the fabric piece overlying said opening, said cover having a double pencil pocket for the reception of pencils of different lengths.

11. In a pocket of the kind set forth, a portion of a garment, a piece of elongated fabric fastened to the exterior thereof, the piece of fabric and portion of the garment respectively constituting the inner and outer walls of a pocket, the outer wall of the pocket near its upper portion having an opening, a cover fastened to the fabric piece and overlying said opening, said cover having spaced openings, thereby permitting of the reception of pencils of different lengths between the cover and a portion of said fabric piece.

12. In a pocket, the combination with a portion of a garment, a piece of fabric fastened to the garment and provided with an elongated opening at its upper portion, a cover attached to the piece of fabric over the opening with one edge free, thereby permitting access to be had to the interior of the pocket, a portion of said cover being attached along one edge of said opening, thereby causing a compartment to be formed between the cover and the piece of fabric, said cover having an opening to permit a pencil to be inserted into said compartment, and a strip fastened to the inner face of the piece of fabric adjacent the lower part of said opening.

13. In a rule pocket, a portion of a garment, an integral piece of fabric fastened about its edges to the portion of the garment and decreasing in width downwardly and having in its upper portion a centrally disposed vertically extending elongated opening, said piece of fabric and the garment constituting the interior and exterior walls of the rule pocket, the base of said opening being relatively broad, the upper portion of the opening being restricted in width as regards the base, and a transverse piece of fabric having its side edges secured between the vertical edge portion of the outer wall of the pocket and the portion of the garment and secured centrally to the fabric piece at the lower end of the opening.

14. In a rule pocket, a portion of a garment, an integral piece of fabric fastened to the portion of a garment and having its upper portion provided with a vertically extending elongated opening spaced from the side edges thereof, said piece of fabric and the garment constituting the exterior and interior walls of the rule pocket, the base of said opening being relatively broad, the opening decreasing in width upwardly, and a transverse piece of fabric having its side edges fastened between the vertical edge portions of the outer wall of the pocket and the portion of the garment and secured to the fabric piece along the base of said opening, said transverse piece of fabric being free from connection with the fabric piece between such vertical edge portions and the edges of the base of the opening and separable therefrom, thereby providing interior pencil holding means.

15. In a rule pocket, a portion of a garment, an integral piece of fabric fastened to the portion of a garment and having its upper portion provided with a vertically extending, elongated opening spaced from the side edges thereof, said piece of fabric and the garment constituting the exterior and interior walls of the rule pocket, the base of said opening being relatively broad, the opening decreasing in width upwardly, and a cover piece secured to the fabric piece along the lower edge of the opening and at its upper edge to the upper edge of the fabric and to the portion of the garment reinforcing the fabric piece at the lower end of the opening and forming a flap for the opening.

16. In a rule pocket, a portion of a garment, an integral piece of fabric fastened to the portion of a garment and having its upper portion provided with a vertically extending, elongated opening spaced from the side edges thereof, said piece of fabric and the garment constituting the exterior and interior walls of the rule pocket, the base of said opening being relatively broad, the opening decreasing in width upwardly, and a cover piece secured to the fabric piece along the lower edge of the opening and at its upper edge to the upper edge of the fabric and to the portion of the garment reinforcing the fabric piece at the lower end of the opening and forming a flap for the opening, said cover piece being secured to the fabric piece along a vertical edge of the opening.

In testimony whereof I hereunto affix my signature.

CHARLES R. WOOD.